Patented Aug. 12, 1924.

1,504,669

UNITED STATES PATENT OFFICE.

JOSEPH BLUMENFELD, OF LONDON, ENGLAND.

TITANIUM COMPOUND.

No Drawing. Application filed April 28, 1924. Serial No. 709,671.

*To all whom it may concern:*

Be it known that I, JOSEPH BLUMENFELD, a citizen of Russia, and residing at London, England, have invented certain new and useful Improvements Relating to Titanium Compounds, of which the following is a specification.

The present invention relates to the preparation of pure titanium oxide of practically constant physical and chemical character from minerals rich in titanium, or from oxide of titanium concentrated by preliminary treatment.

The difficulties which occur in realizing the industrial preparation of titanium oxide of constant and uniform properties are due to continuous changes going on in a collodial solution and the properties of the gel obtained by hydrolysis depend, therefore, on the history of the solution which is to be hydrolized. It is a well-known fact that if one tries to dissolve, for example, ilmenite or oxide of titanium in an acid, sulphuric acid for example, no definite solution is obtained, but a whole continuous series of so-called solutions is produced, including the titanium compound in various forms, i. e., in mechanical suspension, in colloidal solutions more and more dispersed and in crystalloid solution. The intermediate so-called solutions which are produced in practice are constantly in a state of change and have variable properties with reference, first, to filtering qualities; second, stability when diluted; and, third, the effect of temperature changes which make continual alterations in the manufacture necessary.

It has now been discovered that a true crystalloid solution of titanium, i. e., one of constant properties, can be obtained. This solution can be defined and identified without ambiguity. It does not show the Tyndall effect to any appreciable degree. It does not change with time. When heated to temperatures above 65° C., but to below its boiling point, the solution being of such a dilution that its boiling point does not exceed 130° C. titanyl sulphate in the form of needle-like microscopic crystals is precipitated. The composition of the crystals answers to the formula $TiOSO_4 2H_2O$. The solutions of this salt are much more stable than the so-called colloidal solutions when diluted with water or other reagents (sulphuric or hydrochloric acid, or sulphite of soda and the like) and, what seems to be of fundamental importance in the manufacture of $TiO_2$ on a large scale, these solutions always yield products of the same physical and chemical properties when hydrolyzed under the same conditions.

The invention consists in one or more of the following features:—(*a*) The conversion of titaniferous material, e. g. ilmenite, directly into readily clarifiable crystalloid solutions of titanium basic sulphates which yield titanyl sulphate by crystallization. (*b*) The production of titanium gels having a practically constant chemical and physical character, by hydrolysis of the aforesaid crystalloid solution of titanium compounds. (*c*) The utilization of suitable ions of high valency, i. e. trivalent metallic ions in the solution in order to replace the ions of iron, and thus diminish or suppress the adsorption of ferrous or ferric ions by the gel of hydroxide of titanium at the moment of its formation by hydrolysis.

The invention also consists in the processes and the products produced by the processes herein described and claimed or by their obvious chemical equivalents.

In carrying the invention into effect, the titaniferous material, for example ilmenite, is mixed with a quantity of sulphuric acid calculated to obtain in final solution a ratio for one part $TiO_2$ of 1.2 to 2.4 parts of sulphuric acid, depending on the acidity of the solution desired. For example, 350 kilograms of ilmenite are mixed with 500 kilograms of sulphuric acid of 80 per cent concentration or, alternatively, 400 kilograms of sulphuric acid of 100 per cent concentration might be used if diluted with 100 kilograms of water. It is convenient to use Glover tower acid, which has a concentration of 80 per cent. The concentration of the sulphuric acid used must not, however, exceed 90 per cent. The whole is stirred and the reaction is effected in one specific case between the temperature of 140° C. and 170° C. though the process can be worked if the temperature of reaction is between a minimum and maximum of 130° C. and 220° C. respectively. It should be observed that the temperature at which the operation is carried out should be above 120° C. and should gradually be increased to at least 140° C. and may even be raised to 250° C.

Under these conditions the mass is transformed into a paste which gradually stiffens on heating and has at the end of the operation the appearance of a dry grayish-yellow powder. As the titaniferous material—in this example ilmenite—is in excess, only about two-thirds of this material has been attacked, that is to say 100 to 120 kilograms have not been acted upon by the acid and may be returned for treatment in the next batch. About 15 per cent. of the mass obtained is $TiO_2$ in soluble form and in the specific case referred to above this amounts to about 120 kilograms soluble $TiO_2$. The mass is cooled and then the soluble portion is dissolved in water, which may require from one to four hours, depending on the state of division, and the amount of stirring. The volume of water used in this treatment is calculated to obtain a solution containing 150 to 250 grammes of $TiO_2$ per litre.

In working the process, it is convenient to take approximately 1 part of attacked mass and dissolve in approximately 0.8 part of water and at intervals test the specific gravity of the solution. This should be in the nature of, say, 48° Bé. to 54° Bé. If the specific gravity is too high more water is added and if it is too low more attacked mass is added.

The solution obtained after filtering is clear and shows only a very slight Tyndall effect (i. e. it is a solution substantially of crystalloid, and not colloidal, substance). This solution has the characteristic that when heated below its boiling point, between 65° C. and 130° C., at such a dilution that its boiling point does not exceed 130° C., titanyl sulphate in the form of needle-like microscopic crystals is precipitated. The solution may now be crystallized in the manner described in my co-pending application No. 709,672, filed concurrently herewith, or hydrolyzed in the following manner:—

For the preparation of the desired gels the crystalloid solution is submitted to the action of water at a temperature close to the boiling point of the solution under suitable conditions, for example, and preferably as described in my co-pending application No. 690,658, filed Feb. 4, 1924.

The gel produced by hydrolysis, according to the law of adsorption of the electrolytes by the colloidal precipitates, entrains with it a certain portion of the ions present in the solution.

In order to eliminate the very small quantities of iron, it is desirable (1) to prevent the presence of ferric ions which would be adsorbed more strongly than the ferrous ions; (2) to have in the solution the greatest possible concentration of H ions which do not introduce impurities of any kind, that is to say to work with a solution as concentrated as possible, and (3) to work in the presence of trivalent metallic ions which can wholly or partly substitute the ferrous ions. These ions should be selected of such a kind that their presence in the precipitate should not be prejudicial to the aim of the operation, e. g. aluminum or trivalent titanium compound or similar bodies of which the oxides are white should be used if whiteness of the final product is required.

This application is in part a continuation of my copending case 652,187, filed July 17, 1923.

Having now described my invention, what I claim as new and desire to secure by Letters Patent is:—

1. In the process of producing titanium oxide from material containing titanium, the steps of mixing the said material with sulphuric acid, heating the mixture initially to a temperature of at least 130° C. and gradually increasing the temperature to a maximum of 220° C., treating the resulting material with water in such proportions as to produce a solution containing about 15 to 25% of $TiO_2$, and subjecting that solution to hydrolysis while avoiding the presence of any substantial amount of ferric iron therein.

2. Producing titanium hydroxide of constant chemical and physical properties by the hydrolysis of crystalloid titanyl sulphate solutions substantially devoid of Tyndall effect, as described.

3. In the process of claim 2, the step of effecting the hydrolysis in a concentrated solution and in the presence of trivalent metallic ions, substantially as described.

In testimony whereof I have signed my name to this specification.

JOSEPH BLUMENFELD.